(12) United States Patent
Bacon

(10) Patent No.: US 8,069,348 B2
(45) Date of Patent: Nov. 29, 2011

(54) CLIENT DIGITAL PROGRAM INSERTION IN A CONDITIONAL ACCESS MODULE

(76) Inventor: Kinney C. Bacon, Lawrenceville, GA (US)

( * ) Notice: Subject to any disclaimer, the term of this patent is extended or adjusted under 35 U.S.C. 154(b) by 1140 days.

(21) Appl. No.: 11/163,238

(22) Filed: Oct. 11, 2005

(65) Prior Publication Data

US 2007/0083754 A1 Apr. 12, 2007

(51) Int. Cl.
*H04L 29/06* (2006.01)
*H04L 29/00* (2006.01)
*H04N 7/10* (2006.01)

(52) U.S. Cl. ............ 713/160; 713/150; 725/32; 725/33; 725/34; 725/35; 725/36; 725/40; 725/24; 725/14; 725/100; 725/139; 380/229; 380/227; 380/210; 380/200; 709/239; 709/236; 709/246; 370/528; 370/522

(58) Field of Classification Search .................. None
See application file for complete search history.

(56) References Cited

U.S. PATENT DOCUMENTS

| | | | | |
|---|---|---|---|---|
| 5,917,830 | A * | 6/1999 | Chen et al. ................... | 370/487 |
| 6,643,298 | B1 * | 11/2003 | Brunheroto et al. .......... | 370/537 |
| 6,701,528 | B1 | 3/2004 | Arsenault et al. | |
| 6,922,780 | B1 | 7/2005 | Siegel | |
| 7,286,667 | B1 * | 10/2007 | Ryal ............................. | 380/200 |
| 7,292,692 | B2 * | 11/2007 | Bonan et al. ................. | 380/212 |
| 7,298,846 | B2 * | 11/2007 | Bacon et al. ................. | 380/212 |
| 7,319,753 | B2 * | 1/2008 | Candelore et al. ........... | 380/200 |
| 7,376,233 | B2 * | 5/2008 | Candelore et al. ........... | 380/217 |
| 7,409,702 | B2 * | 8/2008 | Cao ............................... | 725/110 |
| 7,702,589 | B2 * | 4/2010 | Candelore ..................... | 705/55 |
| 2002/0056093 | A1 * | 5/2002 | Kunkel et al. ................ | 725/35 |
| 2002/0083439 | A1 * | 6/2002 | Eldering ....................... | 725/32 |
| 2002/0129374 | A1 | 9/2002 | Freeman et al. | |
| 2002/0194613 | A1 * | 12/2002 | Unger ........................... | 725/118 |
| 2003/0021412 | A1 * | 1/2003 | Candelore et al. ........... | 380/217 |
| 2003/0046690 | A1 * | 3/2003 | Miller ........................... | 725/36 |
| 2004/0158858 | A1 * | 8/2004 | Paxton et al. ................. | 725/42 |
| 2004/0187161 | A1 * | 9/2004 | Cao ............................... | 725/110 |
| 2004/0240668 | A1 * | 12/2004 | Bonan et al. ................. | 380/200 |
| 2004/0268420 | A1 * | 12/2004 | Addington et al. ........... | 725/146 |

(Continued)

FOREIGN PATENT DOCUMENTS

| EP | 1 176 827 A2 | 1/2002 |
|---|---|---|
| WO | WO 2005053301 | 6/2005 |

OTHER PUBLICATIONS

Canadian Official Action dated Apr. 19, 2011 cited in Application No. 2,625,756.
International Search Report dated Feb. 19, 2007 cited in Application No. PCT/US2006/037552.
European Office Action dated Aug. 21, 2008 cited in Application No. 06 825 139.6-1241.

(Continued)

*Primary Examiner* — Syed A. Zia
(74) *Attorney, Agent, or Firm* — Merchant & Gould

(57) ABSTRACT

Systems and methods are disclosed for inserting programs into broadcasted primary programs by a conditional access (CA) module that is inserted into a host device, such as a digital-ready television. The CA module utilizes primary and secondary program map tables and/or primary and secondary packet identifiers. A splicer splices the secondary packet identifiers, which is associated with a secondary program, into the primary packet identifiers, which is associated with a program, such as a broadcasted program. Additionally, the CA module may contain memory that is capable of storing the secondary program's packet identifiers and/or program map table that can be used for insertion into the primary program.

13 Claims, 6 Drawing Sheets

U.S. PATENT DOCUMENTS

| | | | |
|---|---|---|---|
| 2005/0028193 A1* | 2/2005 | Candelore et al. | 725/32 |
| 2005/0102702 A1 | 5/2005 | Candelore et al. | 725/100 |
| 2005/0120374 A1* | 6/2005 | Stone et al. | 725/80 |
| 2005/0262537 A1* | 11/2005 | Baran et al. | 725/88 |
| 2006/0136976 A1* | 6/2006 | Coupe et al. | 725/131 |
| 2006/0174264 A1* | 8/2006 | Candelore | 725/34 |

OTHER PUBLICATIONS

European Office Action dated Nov. 5, 2009 cited in Application No. 06 825 139.6-1241.

Canadian Official Action dated Jun. 3, 2010 cited in Application No. 2,625,756.

* cited by examiner

CLIENT DIGITAL PROGRAM INSERTION IN A CONDITIONAL ACCESS MODULE

FIELD OF THE INVENTION

This invention relates in general to broadband communications systems, and more particularly, to the field of cable-ready televisions acting as a host device for a conditional access (CA) module.

DESCRIPTION OF THE RELATED ART

Broadband communications systems, such as satellite and cable television systems, are now capable of providing many services in addition to broadcast video. In implementing enhanced programming, the set-top terminal (STT), also known as the set-top box, has become an important computing device for accessing various audio/video services. In addition to supporting traditional broadcast audio/video functionality, many STTs now also provide other functionality, such as, for example, an interactive program guide (IPG), video-on-demand (VOD), digital video recording, and functionality traditionally associated with a conventional computer, such as e-mail. Additionally, services, such as digital program insertion (DPI), may insert targeted marketing advertisements and other information during broadcasted program breaks. When displaying a television program, a digital STT receives video and audio packet identifiers (PIDs) that correspond with a program defined through a program map table (PMT). Additionally, PIDs are provided that are associated with program insertion either through the program map table or through some other means. Depending upon the actual geographical location of the STT in the system, for example, the STT selects which PIDs, if any, to display to "insert" a targeted commercial into a broadcast program during a commercial break. Digital, or cable-ready, televisions are also now capable of receiving programs directly from the service provider in the communications system. In this case, the television may not require a STT. The digital cable-ready television connects to the communications system via a coaxial cable and is capable of viewing programs that are transmitted in the clear (i.e., not encrypted). However, a conditional access (CA) module, or CableCARD™, is required if the digital signals are encrypted. Accordingly, a CA module is inserted into a socket built into a digital cable-ready television set (i.e., a host device), and the module then decrypts the signals for the host device.

Unfortunately, a host device is unable to implement the digital insertion feature since it typically just governs the program stream as it is received. In other words, the host device is a "watch television" device that does not manipulate the broadcast stream thereby allowing any the insertion or overlay of any other digital programs. Therefore, there exists a need for systems and methods for addressing this problem associated with the CA modules to continue to allow service providers the opportunity to selectively advertise to host devices as well as STTs. Specifically, there exists a need for systems and methods that allow a host device including a CA module to have access to programming and content that could be digitally inserted into the broadcast program stream.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION OF THE PREFERRED EMBODIMENTS

Preferred embodiments of the invention can be understood in the context of a broadband communications system and a local network. Note, however, that the invention may be embodied in many different forms and should not be construed as limited to the embodiments set forth herein. For example, transmitted broadband signals include at least one of video/audio, telephony, data, or Internet Protocol (IP) signals, to name but a few. Furthermore, devices included in the broadband communications system receiving the transmitted broadband signals may include an analog or a digital set-top terminal, a television, a television including a conditional access (CA) module, a consumer electronics device such as a DVD player/recorder, a computer, a personal digital assistant (PDA), or other device. All examples given herein, therefore, are intended to be non-limiting and are provided in order to help clarify the description of the invention.

The present invention is directed towards a conditional access (CA) module that is capable of decrypting at least one encrypted program stream. In other words, the CA module may be capable of decrypting multiple encrypted program streams, where one stream may be a broadcasted program and another stream may be a program for picture-in-picture or a program that is intended to be inserted into the broadcasted program, for example. It will be appreciated, however, that the multiple decryption capability is not necessary to implement the present invention. In accordance with a first embodiment of the present invention, the CA module receives PIDs associated with a broadcasted program, and when a splice request is received, the CA module swaps or inserts PIDs associated with an inserted program. In a further embodiment, a program map table may be replaced when the splice request is received. A further embodiment is directed towards storing a PMT or an insert program in memory within the CA module for insertion. Further detail concerning the hardware and software that allows the CA module the ability to insert digital programs is given hereinbelow.

Figure 1:
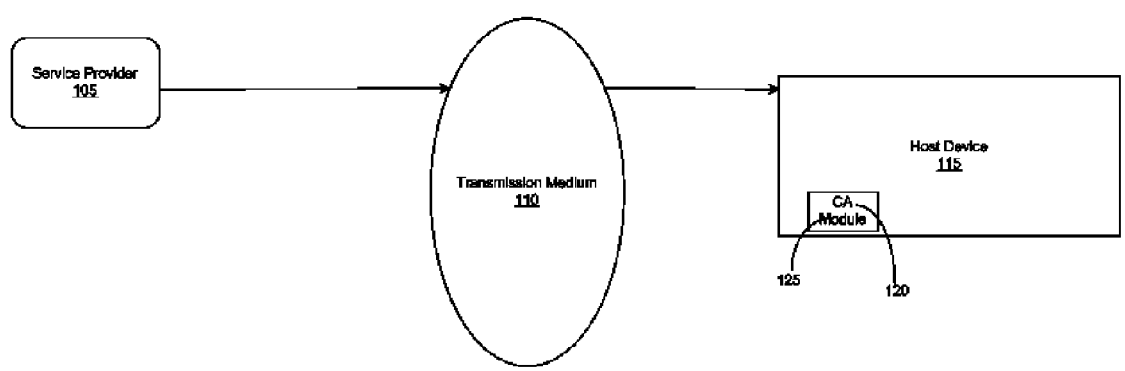
FIG. 1 is a simplified block diagram depicting a non-limiting example of a conventional broadband communications system including a host device with an inserted conditional access (CA) module.

FIG. 1 is a simplified block diagram depicting a non-limiting example of a conventional broadband communications system including a host device with an inserted CA module. A service provider (SP) 105 transmits broadcasted program streams among other streams via a transmission medium 110, which may include fiber optic cables, coaxial cables, or wireless areas, to a plurality of set-top boxes (not shown), and host devices 115. Only one host device 115 is shown in FIG. 1; although, it will be appreciated that there is no limit to the number of host devices included in the communications system and the drawing is not intended to limit that number to one. Typically most service providers 105 encrypt the streams of data, thereby requiring the host devices 115 to include a conditional access (CA) module. In accordance with the present invention, the CA module 120 is inserted into a socket 125 that is manufactured into the host device 115 in order to decrypt any encrypted programs.

Figure 2:
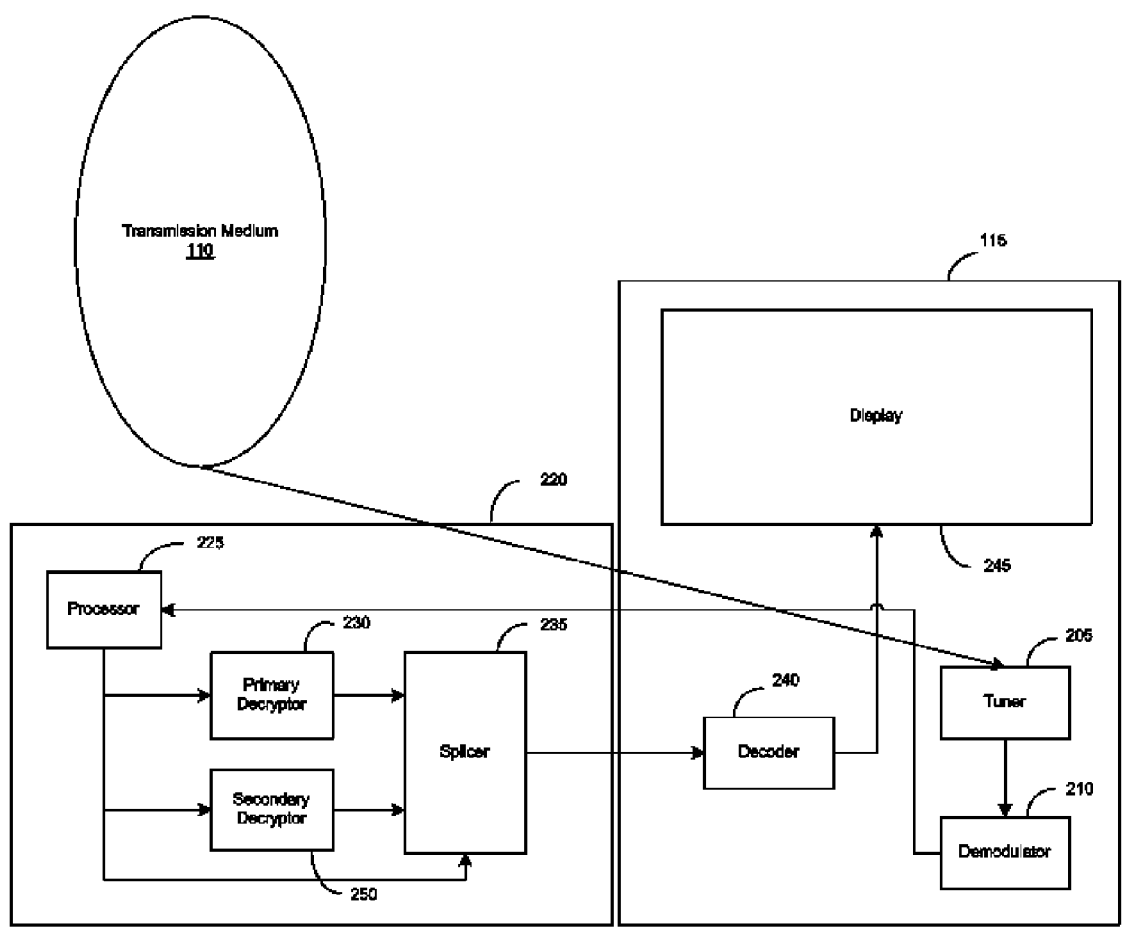
FIG. 2 is a block diagram of a CA module in accordance with a preferred embodiment of the present invention that is inserted into a host device.

FIG. 2 is a block diagram of a CA module 220 in accordance with a preferred embodiment of the present invention that is inserted into the host device 115. The host device 115 receives the transport stream from the transmission medium 110. A tuner 205 tunes to a desired channel and then filters that program to a demodulator 210 for demodulating. If the program is encrypted, the host device forwards the encrypted program to a CA module 220. A processor 225 then provides the program to a primary decryptor 230 that decrypts the primary program. The decrypted program is then provided to a splicer device 235, which is controlled via the processor 225, for replacing or splicing multiple programs together to provide a single spliced stream. The decrypted primary program is then provided to the host device 115 for decoding via decoder 240 and subsequently viewing on a display 245. Additionally, a secondary decryptor 250 may receive a secondary program stream (i.e., picture-in-picture and/or an inserted program) for decryption that can be combined with the primary program. The decrypted inserted program is then provided to the splicer 235 for combining with the decrypted primary program. As mentioned, the secondary decryptor is not necessary for the present invention; for example, if an inserted program is encrypted, the primary decryptor 230 can decrypt the program to be inserted into the primary program.

Figure 3:
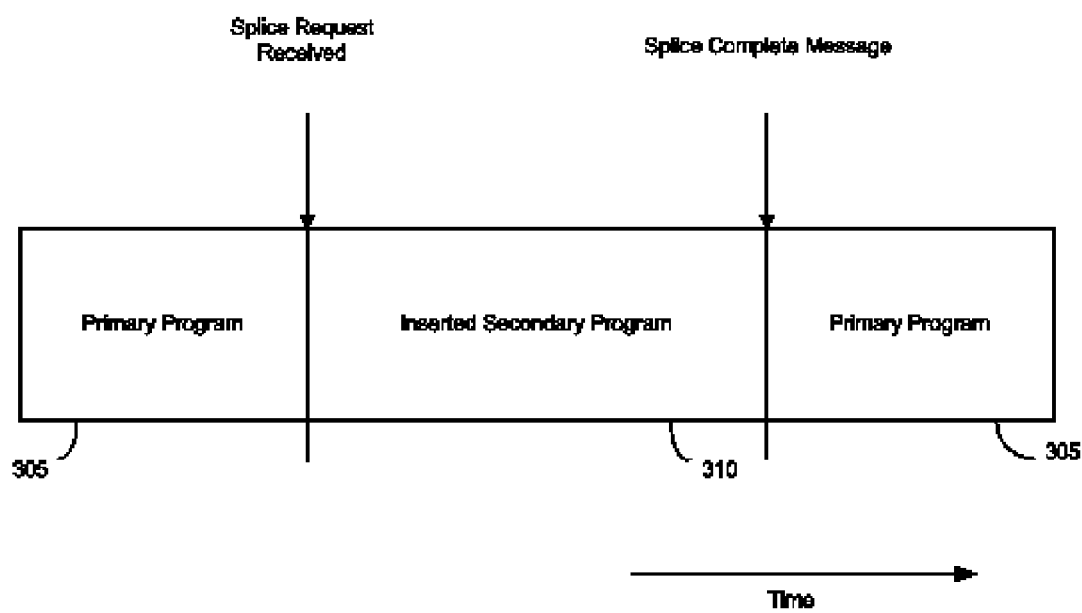
FIG. 3 is a time diagram of the output of the multiplexer 215 combining a primary program and an inserted program to provide a single program stream.

FIG. 3 is a time diagram of the output of the splicer 235 splicing a primary program and an inserted program to provide a single program stream. In accordance with the present invention, a primary program 305 is received at and provided for viewing by the CA module 220. When a message or a splice request is received, the CA module 220 splices in an inserted secondary program 310 into the primary program 305 until such time as a splice complete message is received, and the CA module 220 returns to the primary program.

Figure 4:
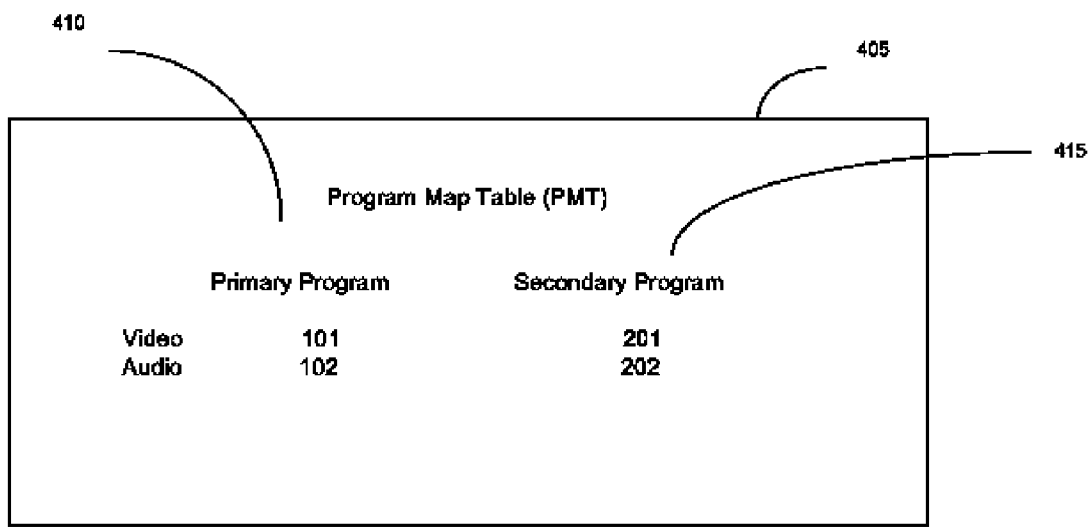
FIG. 4 is a table illustrating an example program map table (PMT) including packet identifiers (PIDs) in accordance with the present invention.

FIG. 4 is a table illustrating an example program map table (PMT) including packet identifiers (PIDs) in accordance with a first embodiment of the present invention. As previously mentioned, program streams comprise video and audio packets that are identified by packet identifiers (PIDs). The PIDs for a given program are defined in a PMT 405 that is transmitted periodically throughout the communications system to the STTs and the host devices. By way of example, a primary program 410 comprises video packet identifier 101 and audio packet identifier 102. A secondary program 415 comprises video packet identifier 201 and audio packet identifier 202. Returning to FIG. 3, the primary program's video and audio packet identifiers 101, 102 are decrypted by the CA module 220 and provided to the host device 115. At the time of the splice request, which can be an embedded cue message, for example, the primary program's PIDs are swapped with the secondary program's video and audio packet identifiers 201, 202, respectively. Likewise, the primary program's PIDs are then swapped back when the splice complete message is received. Further information regarding embedded cue messages can be found at www.scte.org/documents/pdf/ANSI_SCTE302005.pdf.

Figure 5:
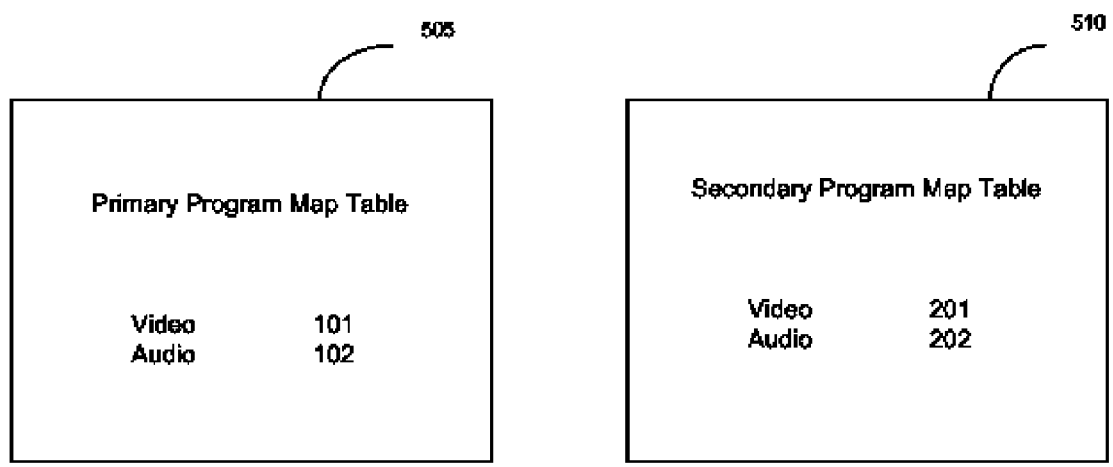
FIG. 5 illustrates tables comprising a primary PMT and a second PMT in accordance with a further embodiment of the present invention.

FIG. 5 illustrates tables comprising a primary PMT and a second PMT in accordance with a further embodiment of the present invention. This embodiment of the invention is directed towards replacing a primary PMT 505 with a secondary PMT 510 at the time of a secondary program insertion request. By way of example, the primary PMT 505 is used for the video and audio PIDs for a particular primary program while the host device 115 is tuned to that primary program. When the splice request is received, the secondary PMT 510 defaults as the primary PMT. Now, the video and audio PIDs for the inserted secondary program are decrypted for the inserted program. Likewise, when the splice complete message is received, the primary PMT 505 defaults back to decrypting the primary PIDs. It will be appreciated that the host device 115 needs to recognize PMT changes quickly enough so that there is not a significant lag or overlap between the primary program and the inserted program.

Figure 6:
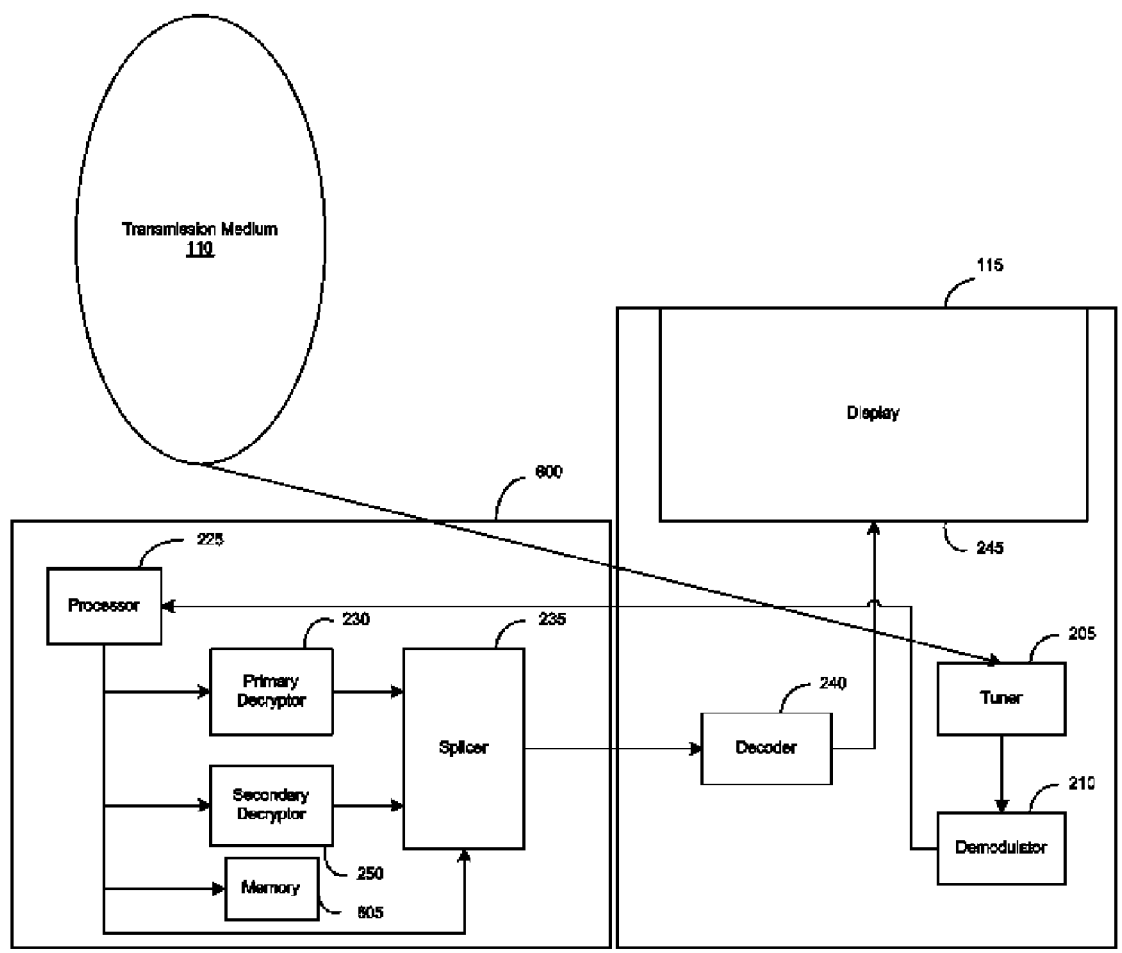
FIG. 6 is a block diagram of a CA module including memory in accordance with a further embodiment of the present invention.

FIG. 6 is a block diagram of a CA module 600 including memory that is inserted into a host device 115 in accordance with a further embodiment of the present invention. Memory 605 is included in a CA module 600 that can store the inserted program until such time as a splice request is received. At that time, the CA module 600 can insert the stored secondary program into the primary program. When the splice complete message is received, the CA module 600 then reverts back to the primary program. In this manner, either the PIDs can be swapped or the PMTs for the primary and the secondary programs can be swapped to allow for the inserted program depending upon implementation.

It should be emphasized that the above-described embodiments of the invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and invention and protected by the following claims. In addition, the scope of the invention includes embodying the functionality of the preferred embodiments of the invention in logic embodied in hardware and/or software-configured mediums.

What is claimed is:

1. A communications system for providing a plurality of primary programs and inserted programs to a plurality of host devices, the communications system comprising:
   a primary program having primary packet identifiers;
   a secondary program having secondary packet identifiers; and
   a host device coupled to the communications system, the host device for tuning and demodulating the primary program and the secondary program from the communications system, the host device comprising a socket manufactured into the host device; and
   a CA module comprising a hardware device for insertion into the socket of the host device, and for receiving the primary program and the secondary program from the host device, the CA module for providing to the host device a spliced program comprising the primary program and the secondary program, wherein the CA module decrypts the primary program identified by the primary packet identifiers, provides the decrypted primary program to the host device for decoding and subsequent viewing and, upon receiving a splice request comprising an embedded cue message, splices into the primary program, a decrypted secondary program identified by the secondary packet identifiers until receiving a splice complete message, wherein the primary and secondary packet identifiers comprise audio and video packet identifiers that differ in value, and wherein the spliced program comprises the primary packet identifiers and, when the splice request is received and processed, the primary packet identifiers are not transmitted until the splice complete message is received and processed wherein the secondary packet identifiers are transmitted subsequent to the splice complete request being received and processed.

2. The communications system of claim 1, wherein the CA module comprises:
   a processor for processing requests included in a transport stream, wherein the transport stream comprises the primary program and the secondary program;
   a primary decryptor for decrypting the primary program and the secondary program; and
   a splicer controlled by the processor for, when the splice request is received, splicing the decrypted primary program and the decrypted secondary program.

3. The communications system of claim 2, wherein the CA module further comprises a secondary decryptor for decrypting a second program and for providing the decrypted second program to the splicer.

4. The communications system of claim 1, wherein the host device comprises a decoder for receiving the spliced program and for decoding the spliced program prior to displaying.

5. A communications system for providing a transport stream comprising a plurality of programs and inserted programs to a plurality of host devices, the communications system comprising:
   a primary and a secondary program map table comprising packet identifiers, the primary and the secondary program map table being stored on a memory device;
   a primary program that is identified by primary packet identifiers located in the primary program map table;
   an inserted program that is identified by secondary packet identifiers located in the secondary program map table;
   a host device coupled to the communications system, the host device for tuning and decoding the primary program and the inserted program; and
   a CA module comprising a hardware device for insertion into a socket manufactured into the host device, and for receiving the primary program and the inserted program from the host device, the CA module for providing to the host device a spliced program comprising the primary program and the inserted program, wherein the CA module provides the primary program identified in the primary program map table and, upon receiving a splice request comprising an embedded cue message, splices in the inserted program identified by the secondary program map table until receiving a splice complete message, wherein the processor processes the primary packet identifiers associated with the primary program that are identified in the primary program map table until the splice request is received and then swaps the primary program map table with the secondary program map table and subsequently processes the secondary packet identifiers that are associated with the inserted program, and wherein the secondary program map table is processed until the splice complete message is received and processed, wherein subsequently the processor swaps the secondary program map table with the primary program map table;
   wherein the CA module comprises:
      a processor for processing requests in the transport stream, wherein the transport stream comprises the primary program, the inserted program, and the primary and secondary program map tables;
      a primary decryptor for decrypting the primary program and the inserted program; and
      a splicer controlled by the processor for, when the splice request is received, splicing the decrypted primary program and the decrypted inserted program, wherein the primary program identified by the primary program map table is decrypted until the splice request is received and processed, and subsequently the inserted program identified by the secondary program map table is decrypted.

6. The communications system of claim 5, wherein the CA module further comprises a secondary decryptor for decrypting a second program and for providing the decrypted second program to the splicer.

7. The communications system of claim 5, wherein the host device comprises a decoder for receiving the spliced program and for decoding the spliced program prior to displaying.

8. The communications system of claim 5, wherein the inserted program is decrypted until the splice complete message is received and processed.

9. The communications system of claim 5, wherein the primary program is a broadcasted program.

10. The communications system of claim 5, wherein the inserted program is a targeted program identified for at least one, but not all, of the plurality of host devices.

11. A communications system for providing a transport stream comprising a plurality of programs and inserted programs to a plurality of host devices, the communications system comprising:
   a primary program that is identified by primary packet identifiers;
   at least one inserted program that is identified by secondary packet identifiers;
   a host device coupled to the communications system, the host device for receiving the at least one inserted program prior to or concurrently with a tuned primary program, the host device comprising a socket manufactured into the host device; and
   a CA module comprising a hardware device including memory for storing the at least one inserted program, the CA module for receiving and decrypting the tuned primary program, the CA module for providing to the host device a spliced decrypted program comprising the primary program and the at least one stored program, wherein the CA module provides the decrypted primary program to the host device for decoding and subsequent viewing, retrieves at least one of the stored programs from memory, decrypts the retrieved at least one stored program, and upon receiving a splice request comprising an embedded cue message, subsequently splices the decrypted at least one retrieved program in with the primary program until receiving a splice complete message, wherein the primary and the at least one stored program comprise audio and video packet identifiers that all differ in value, and wherein the spliced program comprises the primary packet identifiers and, when the splice request is received and processed, the primary packet identifiers are not transmitted until a splice complete request is received and processed;
   wherein the primary packet identifiers are identified in a primary map table stored on the memory, and wherein the at least one stored program packet identifiers are identified in at least one secondary program map table stored on the memory;

wherein the processor processes the primary packet identifiers via the primary map table, and wherein when the splice request is received, the processor swaps the primary map table with the secondary program map table.

12. The communications system of claim 11, wherein the CA module comprises:
a processor for processing requests included in the transport stream that is addressed to its coupled host device;
a primary decryptor for decrypting the primary program and the at least one retrieved program; and
a splicer controlled by the processor for, when the splice request is received, splicing the decrypted primary program and the decrypted at least one retrieved program.

13. The communications system of claim 11, wherein subsequent to the receiving and processing of the splice complete message, the decrypted at least one retrieved program is transmitted to the host device, wherein the at least one retrieved program is identified by the secondary packet identifiers.

* * * * *